United States Patent
Kleinpeter et al.

(10) Patent No.: US 11,831,684 B2
(45) Date of Patent: Nov. 28, 2023

(54) SYSTEMS AND METHODS TO ROTATE SECURITY ASSETS USED FOR SECURE COMMUNICATIONS

(71) Applicant: eBay Inc., San Jose, CA (US)

(72) Inventors: Michael Dean Kleinpeter, San Francisco, CA (US); Raju Venkata Kolluru, San Jose, CA (US)

(73) Assignee: eBay Inc., San Jose, CA (US)

( * ) Notice: Subject to any disclaimer, the term of this patent is extended or adjusted under 35 U.S.C. 154(b) by 51 days.

(21) Appl. No.: 17/570,098

(22) Filed: Jan. 6, 2022

(65) Prior Publication Data

US 2022/0131903 A1     Apr. 28, 2022

Related U.S. Application Data

(63) Continuation of application No. 16/507,812, filed on Jul. 10, 2019, now Pat. No. 11,265,349, which is a
(Continued)

(51) Int. Cl.
  *H04L 9/40*     (2022.01)
  *G06F 21/44*    (2013.01)
  *H04L 9/32*     (2006.01)

(52) U.S. Cl.
  CPC ............ *H04L 63/20* (2013.01); *G06F 21/445* (2013.01); *H04L 9/3263* (2013.01);
(Continued)

(58) Field of Classification Search
  CPC ..... H04L 63/20; H04L 9/3263; H04L 9/3271; H04L 63/062; H04L 63/0823; H04L 2209/56; G06F 21/445
  See application file for complete search history.

(56) References Cited

U.S. PATENT DOCUMENTS 5,657,390 A     8/1997  Elgamal et al.
5,825,890 A    10/1998  Elgamal et al.
(Continued)

OTHER PUBLICATIONS

Advisory Action received for U.S. Appl. No. 12/346,711, dated Jul. 28, 2017, 2 pages.
(Continued)

*Primary Examiner* — Andrew C Georgandellis
(74) *Attorney, Agent, or Firm* — SHOOK, HARDY & BACON L.L.P.

(57) ABSTRACT

Systems and methods to rotate security assets used to for secure communications are disclosed. The system includes initiating a communication session between two servers. Additionally, a server provides a first version of a first certificate to another server. The first version of the first certificate has identifying information including a first public key. The server receives a second certificate. The server determines that the second certificate is trusted by determining that the second certificate has identifying information matching the identifying information of the first version of the first certificate. In response to determining that the second certificate is trusted, the server encrypts the first public key. The server provides the encrypted first public key to the other server. The server then receives a verification of decryption of the encrypted first public key.

18 Claims, 9 Drawing Sheets

Related U.S. Application Data continuation of application No. 15/840,702, filed on Dec. 13, 2017, now Pat. No. 10,389,758, which is a continuation of application No. 12/346,711, filed on Dec. 30, 2008, now Pat. No. 9,860,275.

(52) U.S. Cl.
CPC .......... *H04L 9/3271* (2013.01); *H04L 63/062* (2013.01); *H04L 63/0823* (2013.01); *H04L 2209/56* (2013.01)

(56) References Cited

U.S. PATENT DOCUMENTS

| | | | |
|---|---|---|---|
| 6,996,711 B2 | 2/2006 | Patterson et al. | |
| 7,441,267 B1* | 10/2008 | Elliott | H04L 63/0428 713/153 |
| 7,698,549 B2 | 4/2010 | Thornton et al. | |
| 8,645,697 B1* | 2/2014 | Emigh | H04L 9/3268 713/176 |
| 9,860,275 B2 | 1/2018 | Kleinpeter et al. | |
| 10,389,758 B2 | 8/2019 | Klienpeter et al. | |
| 2002/0129024 A1 | 9/2002 | Lee | |
| 2005/0044363 A1* | 2/2005 | Zimmer | H04L 63/0823 713/170 |
| 2005/0081025 A1* | 4/2005 | Thornton | H04L 63/20 713/155 |
| 2006/0047950 A1 | 3/2006 | Thayer et al. | |
| 2007/0198825 A1 | 8/2007 | Schwarz et al. | |
| 2008/0127322 A1 | 5/2008 | Mccall et al. | |
| 2009/0037997 A1 | 2/2009 | Agbabian et al. | |
| 2010/0169963 A1 | 7/2010 | Kleinpeter et al. | |
| 2018/0103068 A1 | 4/2018 | Kleinpeter et al. | |
| 2020/0084240 A1 | 3/2020 | Kleinpeter et al. | |

OTHER PUBLICATIONS

Advisory Action received for U.S. Appl. No. 12/346,711, dated Oct. 5, 2012, 3 pages.
Final Office Action received for U.S. Appl. No. 12/346,711, dated Aug. 15, 2012, 12 pages.
Final Office Action received for U.S. Appl. No. 12/346,711, dated Dec. 21, 2015, 13 pages.
Final Office Action received for U.S. Appl. No. 12/346,711, dated Jan. 27, 2012, 16 pages.
Final Office Action received for U.S. Appl. No. 12/346,711, dated Mar. 30, 2017, 15 pages.
Non-Final Office Action received for U.S. Appl. No. 12/346,711, dated Apr. 13, 2012, 12 pages.
Non-Final Office Action received for U.S. Appl. No. 12/346,711, dated Aug. 23, 2016, 14 pages.
Non-Final Office Action received for U.S. Appl. No. 12/346,711, dated Aug. 31, 2011, 13 pages.
Non-Final Office Action received for U.S. Appl. No. 12/346,711, dated Jul. 24, 2015, 13 pages.
Non-Final Office Action received for U.S. Appl. No. 12/346,711, dated Mar. 19, 2015, 10 pages.
Notice of Allowance received for U.S. Appl. No. 12/346,711, dated Aug. 23, 2017, 30 pages.
Advisory Action received for U.S. Appl. No. 15/840,702, dated Dec. 31, 2018, 3 pages.
Final Office Action received for U.S. Appl. No. 15/840,702, dated Sep. 11, 2018, 17 pages.
Non-Final Office Action Received for U.S. Appl. No. 15/840,702 dated Apr. 26, 2018, 13 pages.
Notice of Allowance received for U.S. Appl. No. 15/840,702, dated Apr. 3, 2019, 6 pages.
Wikipedia, "Load Balancing (Computing)", Retrieved from Internet URL: https://en.wikipedia.org/wiki/Talk%3ALoad_balancing_ (computing), Oct. 11, 2007, 5 pages.
Non Final Office Action Received for U.S. Appl. No. 16/507,812, dated Mar. 10, 2021, 9 pages.
Notice of Allowance received for U.S. Appl. No. 16/507,812, dated Oct. 22, 2021, 5 Pages.
Final Office Action Received for U.S. Appl. No. 16/507,812, dated Jul. 20, 2021, 9 Pages.

* cited by examiner

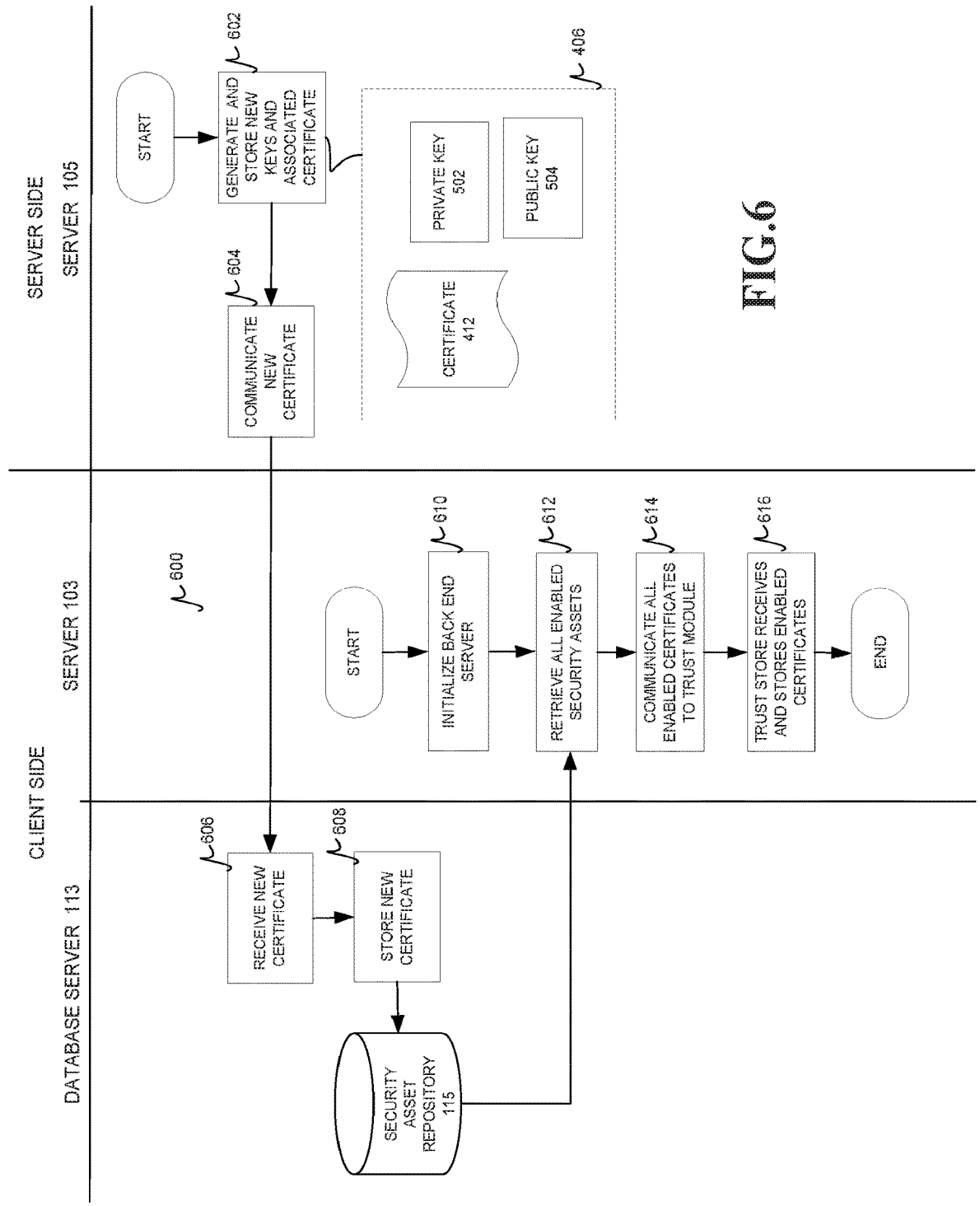

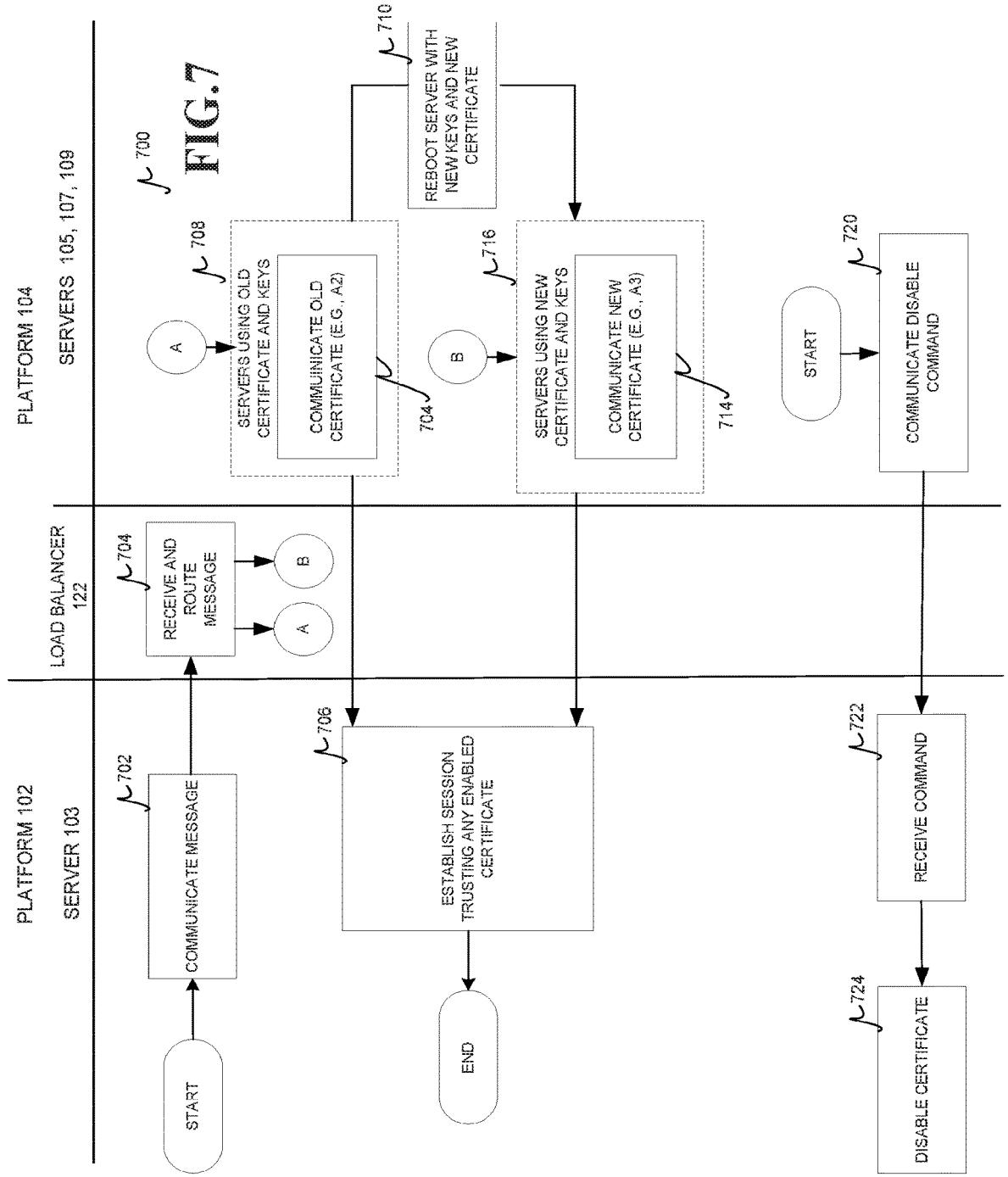

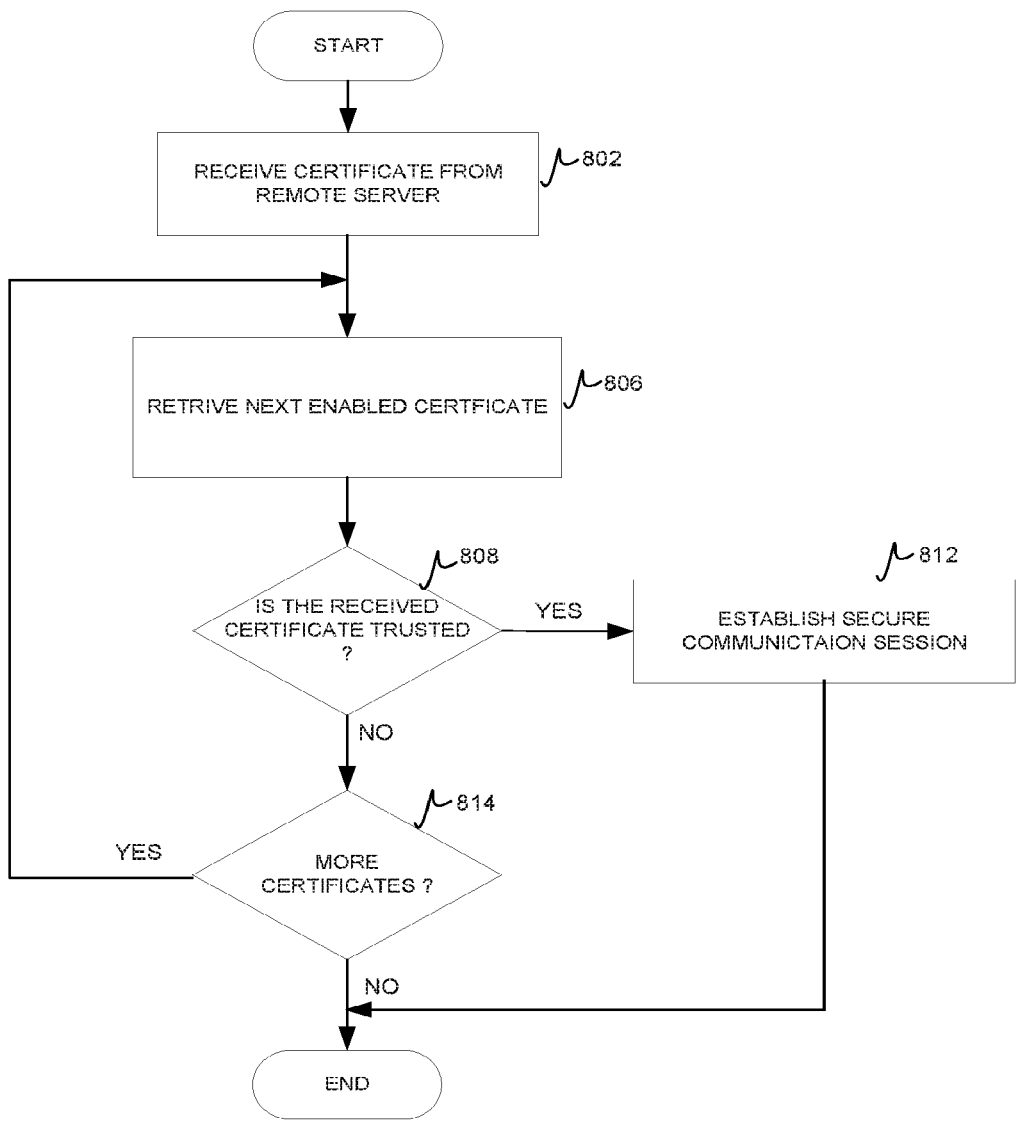

SYSTEMS AND METHODS TO ROTATE SECURITY ASSETS USED FOR SECURE COMMUNICATIONS

CROSS-REFERENCE TO RELATED APPLICATIONS

This application is a continuation of and claims priority to U.S. application Ser. No. 16/507,812, filed Jul. 10, 2019; which is a continuation of and claims priority to U.S. application Ser. No. 15/840,702, filed Dec. 13, 2017; which is a continuation of and claims priority to U.S. application Ser. No. 12/346,711, filed Dec. 30, 2008; each of which is incorporated herein by reference in its entirety.

TECHNICAL FIELD

This disclosure relates to methods and systems supporting computing and data processing systems. More particularly, systems and methods to rotate security assets for securing communications are disclosed.

RELATED ART

Data communications are subject to eavesdropping, tampering, and message forgery. One challenge in ensuring secure communications includes securing communications against fraudulent actors.

BRIEF DESCRIPTION OF THE DRAWINGS

Embodiments illustrated by way of example and not limitation in the figures of the accompanying drawings, in which:

FIG. 6 illustrates a flow chart of a method to retrieve security assets, according to an embodiment;

FIG. 7 illustrates a flow chart of a method, according to an embodiment, to rotate security assets on a plurality of remote servers without downtime;

FIG. 8 illustrates a flow chart of a method, according to an embodiment, to establish a communication session by trusting all enabled certificates.

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

As described further herein, according to various example embodiments of the disclosed subject matter described and claimed herein, there is provided systems and methods to rotate security assets used for secure communications.

Figure 1:
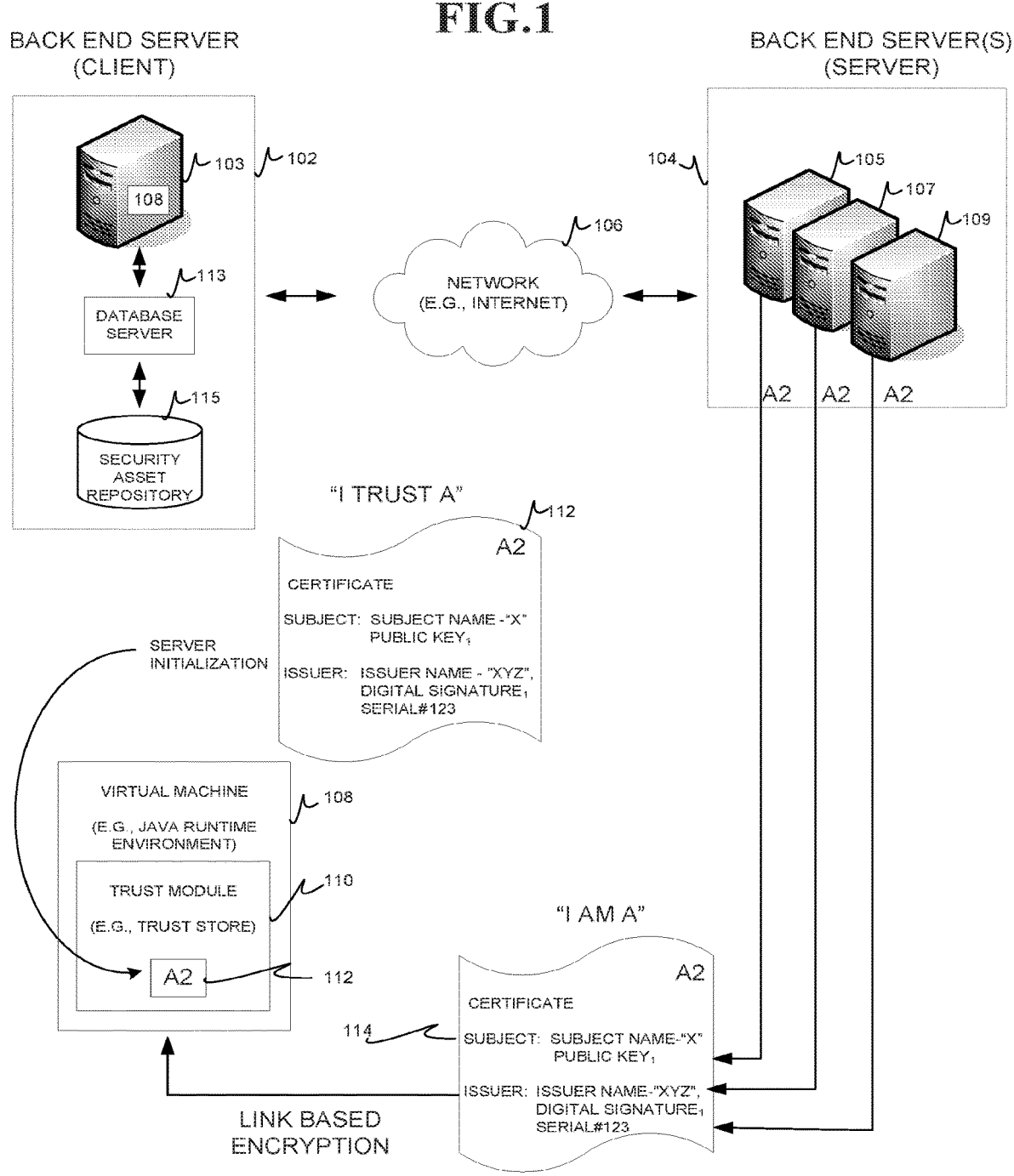
FIG. 1 is a network diagram depicting a system, according to one example embodiment.

FIG. 1 is a network diagram depicting a system 100, according to one example embodiment, having a client-server architecture. The system 100 is shown to include a platform 102 including a single server 103 and a platform 104 including multiple servers 105, 107, and 109. In one embodiment, the servers 103, 105, 107, and 109 may be back end servers in a tiered environment. For purposes of security, the server 103 may be uniquely identified on the network 106 with a first subject name and the servers 105, 107, 109 may be uniquely identified on the network 106 with a second subject name. For example, the subject name may correspond to a legal person (e.g., corporation). In another embodiment, the subject name may correspond to some other recognizable social, business, or organizational entity. One challenge in communicating with the servers associated with the subject name may be to identify that the servers are trustworthy to establish secure communication over the network 106. Indeed, the provision of secure communications may prevent eavesdropping, tampering, and message forgery.

To this end, the platforms 102 and 104 may use a transport layer security (TLS) protocol or a secure sockets layer (SSL) to authenticate servers for secure communications. The TLS or SSL may run on layers beneath application protocols and above a reliable transport protocol (e.g., Transport Control Protocol (TCP)). The application protocols may include, for example, a Hypertext Transport Protocol (HTTP), a File Transfer Protocol (FTP), a Simple Mail Transport Protocol (SMTP), a Network News Transfer Protocol (NNTP), and an Xtensible Message and Presence Protocol (XMPP). While the TLS/SSL may be used to add security to any protocol that uses the TCP, it is most commonly used with HTTP application to form Hypertext Transport Protocol over Secure Socket Layer (HTTPS). For example, the HTTPS may be used to secure the communication, World Wide Web pages for electronic commerce and asset management.

In one embodiment, the TLS or SSL may use a security asset in the form of a certificate to verify the trustworthiness of a remote server. For example, a first server may use a certificate that includes the above-mentioned subject name to ensure that a second server is known and trusted. Such verification may occur at the beginning of a communication session between the two servers in a secure socket layer (SSL) handshake protocol. Typically, the SSL handshake protocol includes an authentication of the server side (e.g., its identity is ensured) of a session while the client side of the session is not unauthenticated. For example, as illustrated in FIG. 1, the server 103 on the client side may use a certificate to ensure that a server 105 on the server side is known and trusted. Other embodiments of the SSL handshake may authenticate both the server and client sides of a communication session.

The following provides an overview of an SSL handshake whereby the server 103 on the client side of a communication session identifies the trustworthiness of the server 105 on the server side of the communication session. The server 103 on the client side may initiate a communication session by communicating a message to the server 105 on the server side. The server 103 is shown to include a virtual machine 108. The virtual machine 108 includes a trust module 110 in the form of a trust store. The virtual machine 108 may use the trust module 110 to authenticate communications received from the server side. To this end, the virtual machine 108 is shown to be initialized with a certificate 112.

The certificate 112 may have been previously generated (e.g., issued) by an issuer, "XYZ" who may be a party associated the platform 104. Further, the certificate 112 may have been previously communicated over the network 106 in a secure manner from the platform 104 to the platform 102 where it was stored via a database server 113 on a security asset repository 115. The certificate 112 may be, at the time the server 103 is initialized, communicated from a security asset repository 115 to the trust module 110. The deposit or storage of the certificate 112 in the trust module 110 constitutes "trust for communications with servers that may be authenticated according to the certificate 112. Accordingly, at the completion of initialization at the server 103, the trust module 110 includes not only the certificate 112 but also the certificates of other subjects (not shown) in whom the platform 102 has placed its "trust."

The certificate 112 includes a subject name, "X," a public key, an issuer name, "XYZ," a digital signature of the issuer, and a serial number that, in conjunction with the issuer name, uniquely identifies the certificate 112, version "A2."

The certificate 112 associates or binds the public key to the subject name, "X." The certificate 112 is further signed by the issuer "XYZ" as represented by the digital signature. For example, the certificate 112 is signed with a private key that is secretively and exclusively held by the issuer "XYZ" on behalf of the servers 105, 107, and 109 and utilized at the platform 104. The server 103 verifies the certificate 112 by using a public key that corresponds to the private key of the issuer "XYZ." Accordingly, the server 103 is able to verify only those certificates that are signed by issuers for which it holds public keys. In general, public and private keys are paired. The private key is exclusively held by the issuer and used to sign the certificates. In contrast, the public key is publicly distributed and used by others to verify the certificates.

As mentioned above, a secure communication session may be established between two servers with an SSL handshake protocol. For example, the server 103 on the client side may initiate a communication session by communicating a message to the server 105 on the server side. In response, the SSL handshake protocol provides for the server 105 communicating a certificate 114 to the server 103. In response to receiving the certificate 114, the server 103 may verify the certificate 114 with a public key of the issuer "XYZ." Next, the server 103 may identify the certificate 114 is authentic. For example, the virtual machine 108 may identify that certificate 114 is authentic by determining the issuer name and the serial number in the certificate 112 in the trust module 110 matches the issuer name and the serial number in the certificate 114 received from the server 105.

In response to identifying an authentic certificate 114, the server 103 may use the public key in the certificate 112 to encrypt a random number that is communicated to the server 105. Only the server 105 may decrypt random number with its private key from the random number, both the server 103 and 105 may generate key material (e.g., a public and private keys) to be used for encryption and decryption maintained throughout the communication session. Generation of key material concludes the SSL handshake and marks the beginning of the secured connection. In one embodiment, the data communicated between the servers 103 and 105 may be encrypted and decrypted at a link level with the key material until the connection closes. If any one of the above steps fails, the SSL handshake fails, and the connection is not created.

One challenge associated with the above SSL handshake occurs when the server side rotates keys. For example, to ensure communications remain secure, the issuers of certificates associated with of the server side may occasionally replace or rotate security assets. The security assets may include a key pair (e.g., public and private key) and an associated certificate that includes the public key. In some facilities, the rotation of the security assets may occur annually. The process typically includes a generation of a new key pair and a corresponding certificate, a distribution of the certificate to the client side, and a synchronized initialization of certificates in the server on the client side and the servers on the server side. As shown in FIG. 1, the servers 105, 107 and 109 on the server side may undergo a temporary interruption in service to rotate the new security assets into service. This interruption in service constitutes down time when service is not provided. Further, it will be appreciated that while the platform 104 is shown to include the three servers 105, 107, and 109, other embodiments may include many more servers thereby constituting a more significant loss of service.

Figure 2:
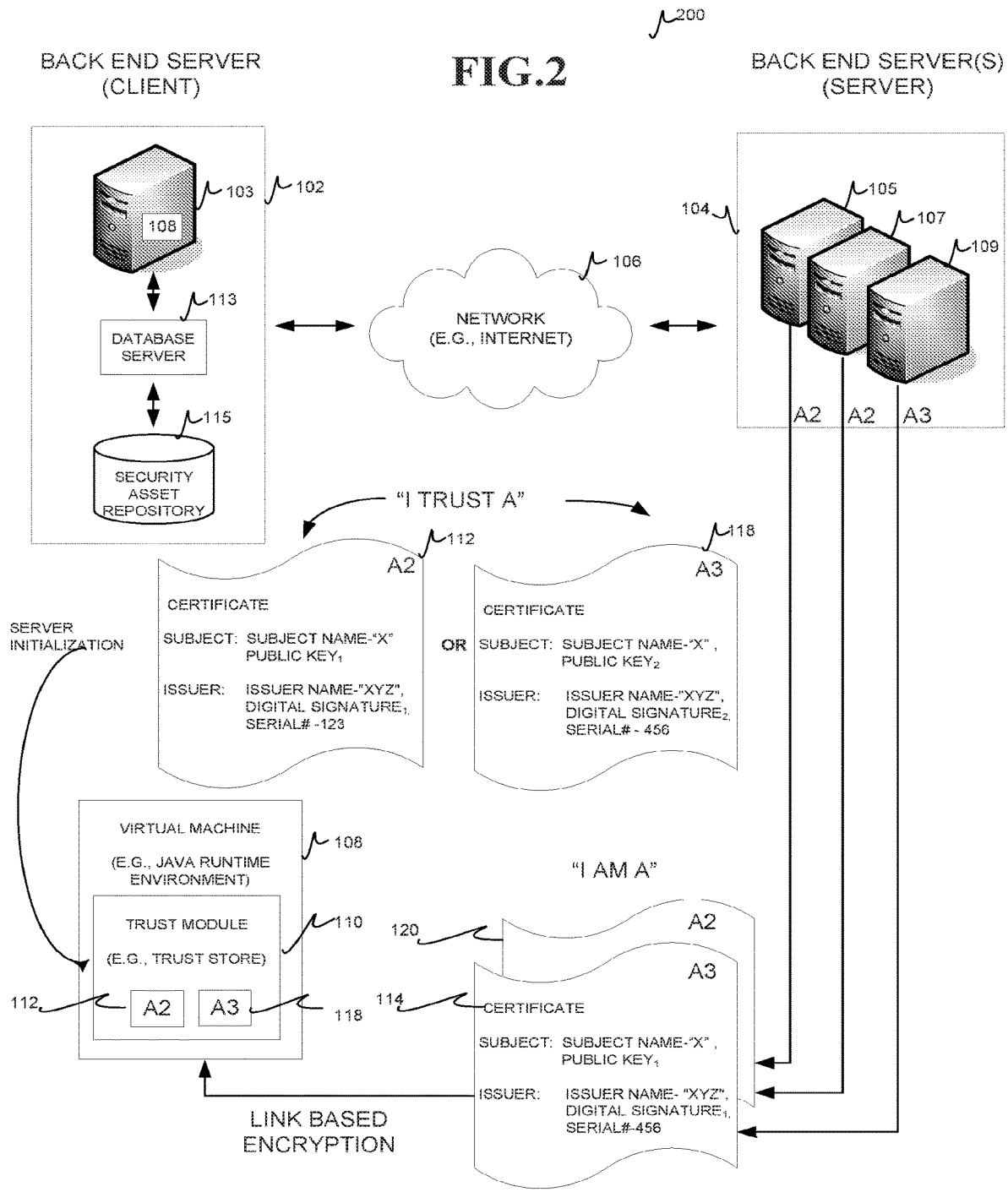
FIG. 2 is a network diagram depicting a system, according to one example embodiment.

FIG. 2 is a network diagram depicting a system 200, according to one example embodiment, having a client-server architecture. The system 200 corresponds to the system 100 on the FIG. 1 and, accordingly, the same or similar references have been used to indicate the same or similar features unless otherwise indicated.

According to a first aspect of the present disclosure a system and method to retrieve multiple security assets from a security asset repository is described. The FIG. 2 illustrates a server initialization of the trust module 110 at the server 103. For example, the server initialization may include a retrieval of multiple security assets from the security asset repository 115. The certificates may include a certificate 112, version "A2," and a certificate 118 (e.g., "A3"). The certificate 112 and the certificate 118 may have been previously communicated from the platform 104 to the server 103 that, in turn, stored the certificate 112 and the certificate 118 on the security asset repository 115.

The certificate 112 includes a first public key for a subject name "X"; and the certificate 118 includes a second and different public key for the same subject name "X." Further, the certificate 112, version "A2," is digitally signed by an issuer "XYZ" with a serial number "123" and the certificate 114 (e.g., "A3") is digitally signed by the same issuer "XYZ" with a different serial number, "456." Accordingly, the server 103 trusts the certificate 112, version "A2," or the certificate 114 (e.g., "A3") that bind or associates the subject name "X" to two different public keys either of which may be used to establish a secure communication session with any one of the remote servers 105, 107 or 109.

According to a second aspect of the present disclosure a system and method to rotate security assets on multiple remote servers without downtime is described. As mentioned above, a secure communication session may be established between any two servers using the SSL handshake protocol. FIG. 2 illustrates, according to an embodiment, that the servers 105, 107, and 109 may be authenticated as trusted in the SSL handshake protocol by communicating either a certificate 114 (e.g., "A3") or a certificate 120, version "A2." As illustrated, the servers 105 and 107 may communicate the certificate 120, version "A2," in an SSL handshake protocol and the server 109 may communicate the certificate 114 (e.g., "A3") in an SSL handshake protocol. The option of communicating the certificate 114 or the certificate 120 in the SSL handshake protocol obviates an interruption in service that would otherwise have occurred to enable a rotation out of the old security assets in the form of certificates 120, 112, version "A2," and a rotation in of the new security asset in the form of the certificates 114, 118, version "A3." For example, according to this second aspect of the disclosure the new security asset, version "A3," may be asynchronously introduced into the respective servers 105, 107, 109. Asynchronous introduction of the new security asset prevents downtime to the users of the application services provide by the servers 105, 107, and 109 because while one of the servers 105, 107, 109 may be taken down to introduce the new security assets the remaining servers may continue to provide service.

Figure 3:
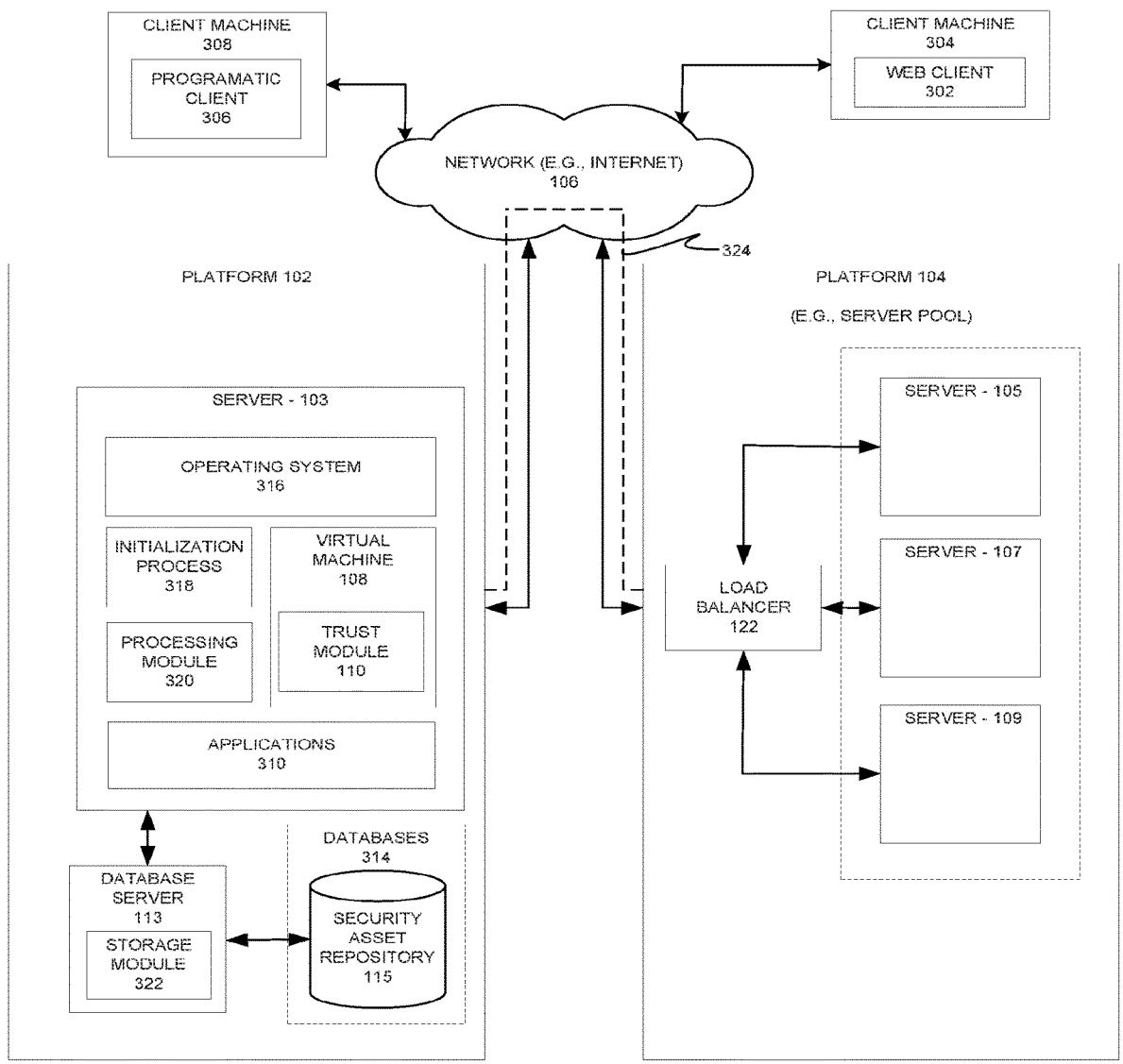
FIG. 3 is a block diagram illustrating a system, according to an example embodiment.

FIG. 3 is a network diagram depicting a system 300, within which one example embodiment may be deployed. The system 300 corresponds to the system 100 in FIG. 1 and the system 200 in FIG. 2; accordingly, the same or similar references have been used to indicate the same or similar features unless otherwise indicated. A platform 102 and a platform 104 may provide server-side functionality, via a network 106 (e.g., the Internet or Wide Area Network (WAN)) to one or more clients. FIG. 3 illustrates, for example, a web client 302 (e.g., a browser, such as the Internet Explorer browser developed by Microsoft Corporation of Redmond, Wash. State) executing on client machine 304 and a programmatic client 306 executing on client machine 308.

The server 103 hosts one or more applications 310 including modules. The servers 103, 105, 107, and 109 are, in turn, shown to be coupled to one or more database servers that facilitate access to one or more databases. The security asset repository 115 may store security assets, as previously described. For example, a security asset may include a private key, a public key, and/or a certificate.

The modules included in the applications 310 may provide a number of functions and services to users that access the respective platforms 102, 104. For example, the applications 310 may provide commerce service functions and services and the applications 310 may provide payment functions and services. In addition, other embodiments may provide information storage and retrieval services (e.g., search engine) or other types of functions and services.

The platform 102 is further illustrated as including components including an operating system 316, an initialization process 318, a processing module 320, a virtual machine 108, a trust module 110, a storage module 322, and database 314 comprising a security asset repository 115. The components are described below with regard to the platform 102.

The operating system 316 provides a number of functions and services for the other software components on the platform 102. The operating system 316 may be embodied as Windows Vista Operating System developed by Microsoft Corporation of Redmond, Wash. State. Another embodiment may include the Linux Operating System distributed by Red Hat, of Raleigh, N.C. Other embodiments may utilize other operating systems.

The initialization process 318 may be executed responsive to a boot of the server 103. The initialization process 318 may execute to provide initialization services for the server 103. One service may include invoking the processing module 320 to initialize security related functions for the server 103. For example, the processing module 320 may facilitate the registration of security assets in the trust module 110 by retrieving enabled security assets from the security asset repository 115 and communicating the enabled security assets to the trust module 110. In one embodiment, the security assets may have been previously communicated from the platform 104 to the platform 102 and stored by the storage module 322 in security asset repository 115.

The processing module 320, trust module 110, and virtual machine 108 may operate to execute the SSL handshake protocol, as described above. In one embodiment, the trust module 110 may store a resident copy of all enabled security assets in support of the SSL handshake protocol. The virtual machine 108 may be embodied as the Java Runtime Environment developed by Sun Microsystems of Mountain View, Calif.

The platform 104 includes a load balancer 122 and the servers 105, 107, or 109, as previously mentioned. The load balancer 122 may receive messages including certificates and route the messages to one of the servers 105, 107, or 109 for processing. For example, the load balancer 122 may route the message to a server with the least load. Accordingly, the servers 105, 107, or 109, may be considered members of a server pool. The server pool may be identified with a subject name for security purposes. The servers 105, 107 and 109 under the identity of the same subject name may provide functionality and utilize the same security assets (e.g., certificates) to enable secure communications with the server 103. In one embodiment, the SSL handshake protocol may be used by to establish a secure socket layer (SSL) connection 324 between the server 103 and the servers 105, 107, 109. For example, the server 103 may perform the role of a client by initiating the SSL connection 324 with one of the servers 105, 107 and 109 that may take the role of a server in the SSL connection. It will be appreciated by one having skill in the art that the roles may be reversed with one of the servers 105, 107 and 109 taking the role of a client and the server 103 taking the role of a server.

Further, while the platform 102 is illustrated as having a single server 103 it will be appreciated by one having ordinary skill in the art that multiple servers may operate on the platform 102. Nevertheless, for the purpose of clarity the operations at a single server 103 are described even though the same operations may be performed by additional servers on the platform 102.

Further, while the system 300 shown in FIG. 3 employs a client-server architecture, embodiments of the present disclosure are of course not limited to such an architecture and could equally well find application in a distributed, or peer-to-peer, architecture system, for example. The various applications 310 could also be implemented as standalone software programs, which do not necessarily have networking capabilities.

The web client 302 accesses the various applications 310 that may be supported by the servers 103, 105, 107 and 109. Similarly, the programmatic client 306 accesses the various services and functions provided by the applications 310. In one embodiment, the programmatic client 306 may, for example, be a seller application (e.g., the TurboLister application developed by eBay Inc., of San Jose, Calif.) to enable sellers to author and manage listings on a network-based marketplace in an off-line manner, and to perform batch-mode communications between the programmatic client 306 and the server 103.

Figure 4A:
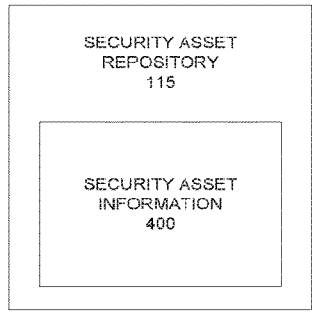
FIG. 4A is a block diagram illustrating a security asset repository, according to an embodiment.

FIG. 4A is a block diagram illustrating a security asset repository 115, according to an embodiment. The security asset repository 115 may store security asset information 400.

Figure 4B:
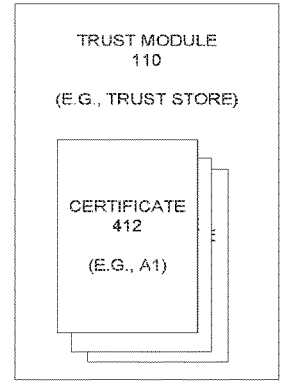
FIG. 4B is a block diagram illustrating a trust module, according to an embodiment.

FIG. 4B is a block diagram illustrating a trust module 110, according to an embodiment. The trust module 110 (e.g., trust store) includes certificates 412 that may be used to authenticate servers. In one embodiment, the trust module 110 (e.g., trust store) may be created with Java Secure Socket Extension developed by Sun Microsystems of Mountain View, Calif.

Figure 4C:
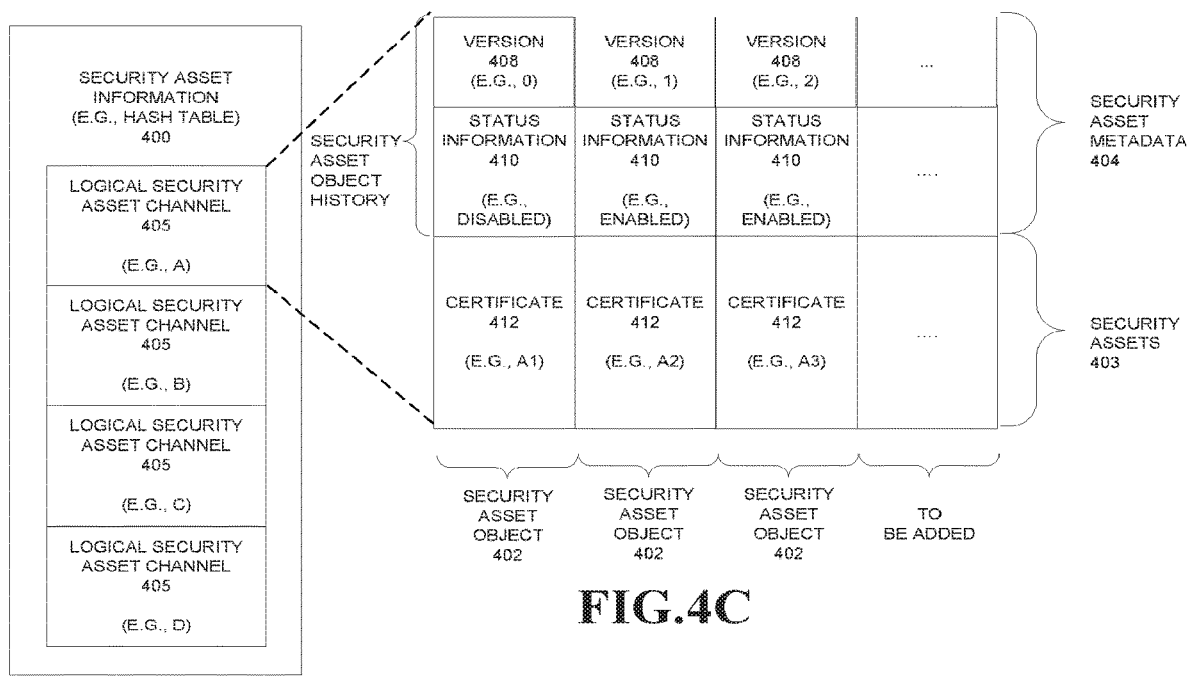
FIG. 4C is a block diagram illustrating a security asset repository, according to an embodiment.

FIG. 4C is a block diagram illustrating security asset information 400, according to an embodiment. The security asset information 400 may be embodied as a hash table that includes multiple entries of logical security asset channels 405. The logical security asset channel 405 may be used to organize one more security asset objects 402 for a particular subject name. In one embodiment, the older security asset objects 402 may be located on the left and newer security asset objects 402 may be located to the right. In such an embodiment, the addition of a security asset object 402 may be made to the right of the logical security asset channel 405. The security asset objects 402 may include security asset metadata 404 and security assets 403. The security asset metadata 404 may include a version 408 (e.g., 0, 1, 2, 3, etc.) and status information 410. The status information 410 may include an enabled/disabled status, a start date and time, an end date and time, and other status information. The start date and time and the end date and time may be used to identify a period of time the security asset object 402 is enabled. In one embodiment, the start date and time and the end date and time may be overridden with a command to disable or enable the security asset 403. Multiple security asset objects 402 may be enabled at the same time for the same entity name. The security assets 403 may include a certificate 412, as shown in FIG. 4C, a public key, a private key, a key pair (e.g., a paired public and private key), a secret key, a non-key (e.g., password) or some other type of used for secure communications.

Figure 5A:
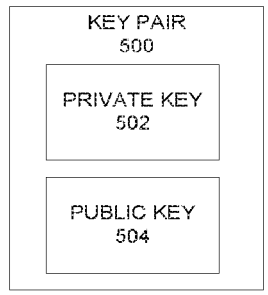
FIG. 5A illustrates a key pair, according to an embodiment.

FIG. 5A illustrates a key pair 500, according to an embodiment. The key pair 500 includes a private key 502 and a public key 504. The pair of keys in the key pair 500 may be used for asymmetric cryptography. Asymmetric cryptography is characterized by one key being used to encrypt data (e.g., message, byte stream, etc.) and a corresponding key being used to decrypt the data, as previously mentioned. In asymmetric cryptography, the private key 502 is kept secret, while the public key 504 may be publicly distributed. An incoming message or a byte stream may be encrypted at an originating end with a public key 504 and communicated to a destination end. At the destination end, the message may be decrypted with a private key 502 that corresponds to the public key 504. The key pair 500 is related mathematically. Nevertheless, the private key 502, for practical purposes, may not be derived from the public key 504.

Figure 5B:
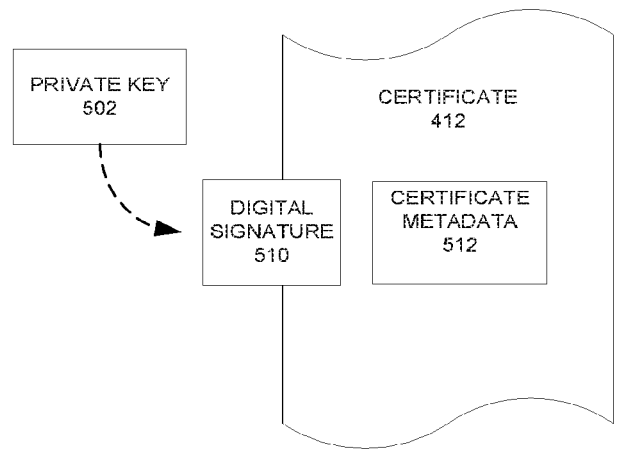
FIG. 5B illustrates a certificate, according to an embodiment.

FIG. 5B illustrates a certificate 412, according to an embodiment. The certificate 412 includes certificate metadata 512 and is cryptographically signed with a digital signature 510. For example, the digital signature 510 may be created with the private key 502 of an issuer who issued (e.g., generated) the certificate 412. The signing includes a signing algorithm which, given the certificate 412 and the private key 502, may be used to generate the digital signature 510. The digital signature 510 may be communicated with the certificate 412 to a destination and remotely verified at the destination with a corresponding public key 504.

Accordingly, a successful verification strongly suggests that the issuer of the certificate 412 signed the certificate 412 and that the contents of the certificate 412 remain intact. Further, the successful verification assures the destination, to the extent of the trustworthiness of the issuer, that an entity with the subject name in the certificate metadata 512 is bound or associated to the public key 504 included in the certificate 412.

Figure 5C:
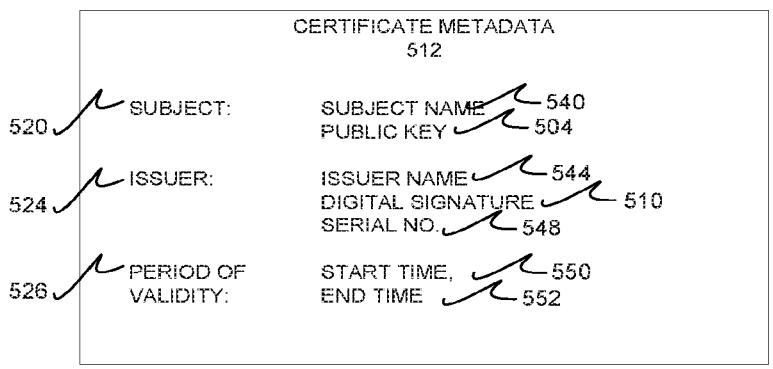
FIG. 5C illustrates a certificate metadata, according to an embodiment.

FIG. 5C illustrates a certificate metadata 512, according to an embodiment. The certificate metadata 512 includes subject information 520, issuer information 524, and a period of validity 526. The subject information 520 includes a subject name 540 and a public key 504. The subject name 540 identifies the trusted subject and is associated or bound with the public key 504, as previously described. The issuer name 544 identifies the issuer in the issuer information 524 and is associated with the digital signature 510, previously described, and a serial number 548. The serial number 548 in association with the issuer name 544 constitutes a particular version of the certificate 412. The period of validity includes a start time 550 (e.g., not valid before a date and time) and an end time 552 (e.g., not valid after date and time). For example, the certificate 412 may be enabled for a period of time that is terminated by the start time 550 and the end time 552. In one embodiment, the period of validity 526 may be overridden with a command. For example, the certificate 412 may be enabled or disabled with a command notwithstanding the period of validity 526.

Methods

Security Asset Retrieval

FIG. 6 illustrates a flow chart of a method 600, according to an embodiment, to retrieve security assets 403, as shown in FIG. 4C. Illustrated on the left are operations performed by a client side of an SSL handshake protocol and illustrated on the right are operations performed by a server side of an SSL handshake protocol. For the purpose of clarity, the method 600 does not illustrate the SSL handshake protocol but rather the retrieval of multiple security assets 403 in preparation of the SSL handshake protocol.

The method commences at operation 602 on the server side with the server 105 issuing (e.g., generating) security assets 403 in the form of a private key 502, a public key 504, and a first certificate 412. For example, the server side may generate the security assets 403 in preparation of a scheduled rotation of the security assets 403. Next, the server 105 may store the security assets 403 in the security asset repository 115 coupled to the server 105. At operation 604, the server 105 may communicate the certificate 412 to the server 103. For example, the server 103 may communicate the certificate 412 in an email.

At operation 606, on the client side, the database server 113 may receive the certificate 412. At operation 608, the storage module 322 on the database server 113 stores the certificate 412 in the security asset repository 115. For example, the storage module 322 may store the certificate 412 in the next available position in the logical security asset channel 405 associated with the subject name 540 in the first certificate 412. Subsequent to storage of the certificate 412, the logical security asset channel 405 may now store two certificates 412. For example, a first certificate 412 may include the following certificate metadata 512:

Subject Name 540 "XYZ Payment Service"
Issuer Name 544 "XYZ Payment Service Operations"
Serial Number 548 "123"
Start Time 550 "Jun. 1, 2007, 2:00 AM"
End Time 552 "Jun. 30, 2008, 2:00 AM"

Further, a second certificate may include the following certificate metadata 512:

Subject Name 540 "XYZ Payment Service"
Issuer Name 544 "XYZ Payment Service Operations"
Serial Number 548 "456"

Start Time 550 "Jun. 1, 2008, 2:00 AM"
End Time 552 "Jun. 30, 2009, 2:00 AM"

Accordingly, the above two certificates 412 are enabled for an overlapping period of time from Jun. 1, 2008 to Jun. 30, 2008.

At operation 610, at the server 103, the initialization process 318 may execute to initialize the server 103. For example, the initialization process 318 may automatically execute in response to a rebooting of the server 103. Also for example, the initialization process 318 may execute in response to a scheduled invocation or a command that is received from an operator. At operation 612, the initialization process 318 invokes the processing module 320 to initialize the security related services for the server 103. To this end, the processing module 320 may retrieve all enabled security assets 403 from the security asset repository 115. In one embodiment, the processing module 320 may retrieve the enabled security assets according to logical security asset channel 405 for the subject name 540 "XYZ Payment Service." For example, the retrieved security assets 403 may include the above-described first and second certificates 412 both of which are enabled. Other embodiments may include fewer or more security assets 403. At operation 614, the processing module 320 communicates the retrieved security assets 403 to the trust module 110 (e.g., trust store) that, in turn, at operation 616 stores the security assets 403 in the trust module 110 and the process ends.

Security Asset Rotation

FIG. 7 illustrates a flow chart of a method 700, according to an embodiment, to rotate security assets on a plurality of remote servers without downtime. Illustrated on the left are operations performed by a server on the client side of an SSL handshake protocol and illustrated on the right are operations performed by a platform 104 on a server side of an SSL handshake protocol.

State 708 may include one or more servers. Further, the servers in the state 708 may identify themselves in an SSL handshake protocol with the certificate 412, version "A2." For example, the state 708 may include the servers 105 and 107 that identify themselves in an SSL handshake protocol with the certificate 412, version "A2."

State 716 may include one or more servers. Further, the servers in the state 716 may identify themselves in an SSL handshake protocol with the certificate 412, version "A3." For example, the state 716 may include the server 103 that identifies itself in an SSL handshake protocol with the certificate 412, version "A3"

The method commences at operation 702, on the client side, with the server 103 communicating a message to the platform 104.

At operation 704, at the platform 104, the load balancer 122 receives the message. Next, the load balancer 122 routes the message to a server. For example, the load balancer 122 may route the message to any one of multiple servers in the state 708 or to any one of multiple servers in the state 716.

At operation 704, any one of the multiple servers may receive the message. For example, the server 105 may receive the message and respond to receiving the message by communicating a certificate 412, version "A2," to the server 103.

At operation 714, any one of the multiple servers may receive the message. For example, the server 109 may receive the message and respond to receiving the message by communicating a certificate 412, version "A3," to the server 103.

At operation 710, a server 105 or 107 in the state 708 may be rebooted. In response to the reboot, the server 105 or 107 may transition to the state 716. Accordingly, the transitioned server may cease to identify itself in the SSL handshake with the certificate 412, version "A2" and begin to identify itself with a certificate 412, version "A3." Other embodiments may utilize some process other than a reboot to rotate out the certificate 412, version "A2" and rotate in the certificate 412, version "A3."

Disabling a Security Asset

At operation 720, the server 105 may communicate a message to disable the certificate 412, version "A2." For example, in response to all of the servers 105, 107 and 109 being in the state 716 the certificate 412, version "A2," may be disabled at the server 103.

At operation 722, the processing module 320, at the server 103, may receive the command to disable the certificate 412, version "A2." At operation 724, the processing module may disable the certificate 412, version "A2." For example, the processing module 320 may override a time period in the certificate 412, version"A2" to disable the certificate 412, version "A.2." In one embodiment, the processing module 320 may disable the certificate 412, version "A2," in the trust module 110 and/or cause the disabling of the certificate 412, version "A2," in the security asset repository 115.

FIG. 8 illustrates a flow chart of a method 800, according to an embodiment, to establish a communication session by trusting all enabled certificates 412 (e.g., versions "A2," "A3," etc.). The method 800 corresponds to the operation 706 on the FIG. 7. At operation 802, the processing module 320 may receive a certificate 412 in the form of a third certificate 412 from one of the remote servers 105, 107, or 109. For the present example, a certificate 412, version "A3" is received from the remote server 105 and identified as such according to the issuer name 544 and serial number 548. Next, the processing module 320 may communicate the certificate 412, version "A3," to the trust module 110.

At operation 806, the trust module 110 retrieves the next certificate 412 in the trust module 110. At decision operation 808, the trust module 110 identifies whether the received certificate 412, version "A3," is trusted. For example, if the certificate 412 received from the remote server 109 includes an issuer name 544 and a serial number 548 that matches the same fields in any of the certificates 412 retrieved from the trust module 110 then the received certificate 412 is identified as trusted. For example, the trust module 110 may include a first certificate 412, version "A2" that may include certificate metadata 512 as follows:

Subject Name 540 "XYZ Payment Service"
Issuer Name 544 "XYZ Payment Service Operations"
Serial Number 548 "123"
Start Time 550 "Jun. 1, 2007, 2:00 AM"
End Time 552 "Jun. 30, 2008, 2:00 AM"

Further, the trust module 110 may include a second certificate 412, version "A3," that may include certificate metadata 512 as follows:

Subject Name 540 "XYZ Payment Service"
Issuer Name 544 "XYZ Payment Service Operations"
Serial Number 548 "456"
Start Time 550 "Jun. 1, 2008, 2:00 AM"
End Time 552 "Jun. 30, 2009, 2:00 AM"

Accordingly, if the received certificate 412 includes an issuer name 544 and a serial number 548 that matches an issuer name 544 and a serial number 548 for any of the above two certificates 412, version "A2" or "A3," then the received certificate 412 is identified as trusted. In the present example, the received certificate 412 is a version "A3." Accordingly, the received certificate 412, version "A3" is identified as trusted. Other embodiments may include few or more certificates 412 in the trust module 110.

At decision operation 814, the trust module 110 identifies whether there are more certificates 412 in the trust store 110. If there are more certificates 412 then a branch is made to operation 806.

At operation 812, the server 103 may establish a secure communication session with the server 109 by generating and communicating key material, as previously described. In one embodiment, the secure communications session may include a hypertext transport protocol session over a secure socket layer connection. Otherwise, the process ends.

Figure 9:
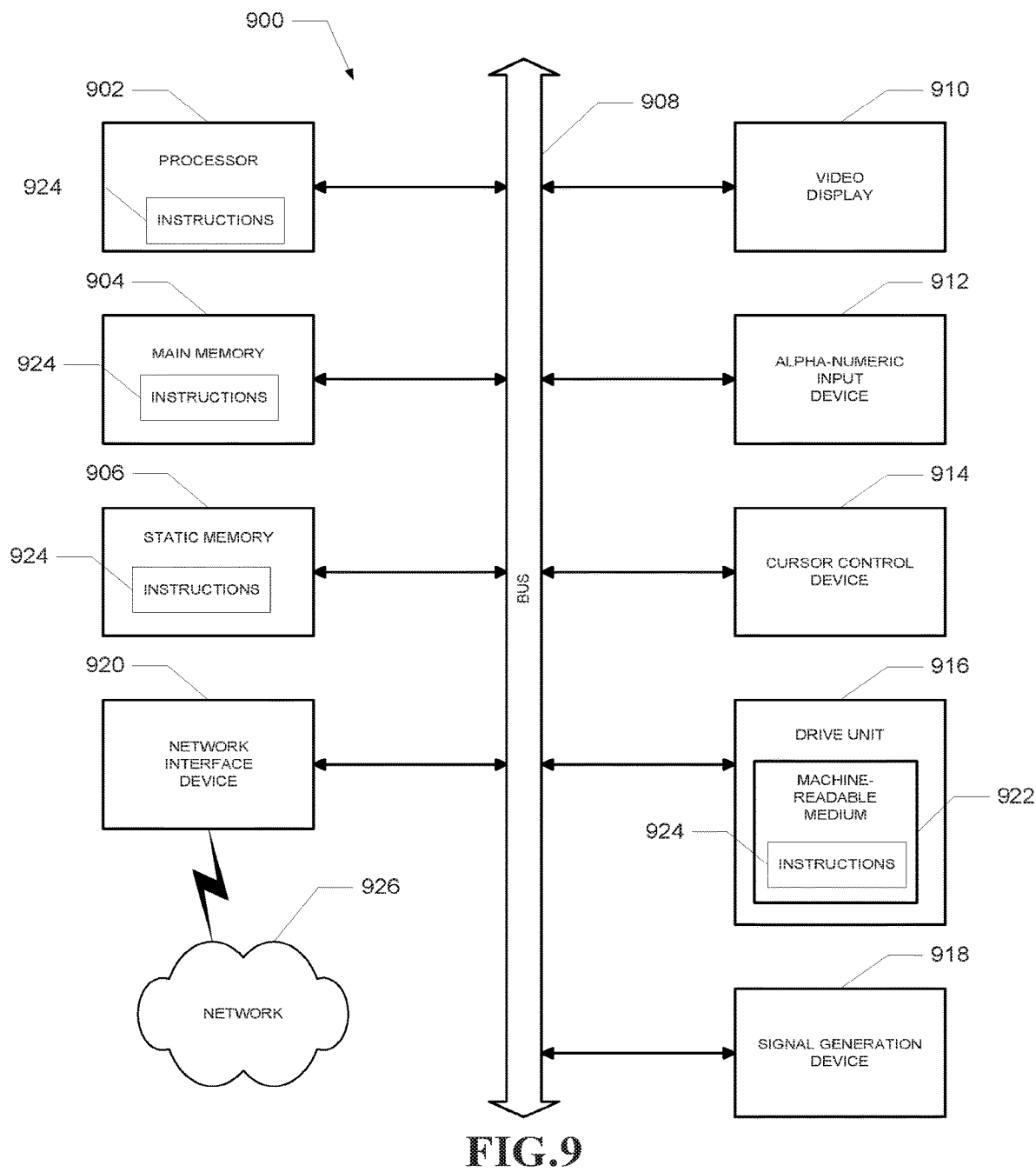
FIG. 9 shows a diagrammatic representation of a machine in the form of a computer system within which a set of instructions, for causing the machine to perform any one or more of the methodologies discussed herein, may be executed, according to an example embodiment.

FIG. 9 shows a diagrammatic representation of a machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions 924 (e.g., software) embodying any one or more of the methodologies or functions described herein. The instructions 924 may also reside, completely or at least partially, within the main memory 904, the static memory 906, and/or within the processor 902 during execution thereof by the computer system 900. The main memory 904 and the processor 902 also may constitute machine-readable media. The instructions 924 may further be transmitted or received over a network 926 via the network interface device 920.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit.

Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein.

Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to rotate security assets used for secure communications are disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A method comprising:
   initiating a communication session between a first server and a second server;
   providing, via the first server, a first certificate to the second server, the first certificate having identifying information including a first public key and a first subject name that, in conjunction, uniquely identify the first certificate;
   receiving, from the second server, a second certificate;
   determining, by the first server, that the second certificate is trusted by determining that the second certificate has identifying information matching the identifying information of the first certificate;
   in response to determining that the second certificate is trusted, encrypting, by the first server, data using the first public key;
   providing the encrypted data to the second server;
   receiving, from the second server, a verification of decryption of the encrypted data that was encrypted using the first public key; and
   based on receiving the verification, asynchronously introducing at least one security asset associated with the second certificate to the second server, such that an application service provided by the second server undergoes a temporary interruption during the asynchronous introduction of the at least one security asset into the second server, and such that the application service is provided to a client computing device via another server while the at least one security asset is being introduced to the second server.

2. The method of claim 1, wherein the data is encrypted at a link level.

3. The method of claim 1, wherein the identifying information of the second certificate matching the identifying information of the first certificate comprises a subject name.

4. The method of claim 3, wherein initiating the communication session comprises receiving, from the second server, a message.

5. The method of claim 3, further comprising:
   prior to asynchronously introducing the at least one security asset, accessing a plurality of security assets associated with the subject name of the second certificate and the first certificate; and
   identifying the at least one security asset of the plurality of security assets that is associated with the second certificate.

6. The method of claim 5, further comprising:
   identifying a plurality of servers associated with the first certificate; and
   asynchronously introducing the at least one security asset associated with the second certificate to the plurality of servers.

7. The method of claim 1, wherein determining that the second certificate has identifying information matching the identifying information of the first certificate comprises determining an issuer name and a serial number of the identifying information of the first version of the first certificate matches the issuer name and the serial number of the identifying information of the second certificate.

8. The method of claim 1, further comprising:
   providing, via the first server, a second version of the first certificate to the second server, the second version of the first certificate having identifying information including a second public key that is different than the first public key of a first version of the first certificate; and
   determining, by the first server, that the second version of the first certificate is trusted by determining that the second version of the first certificate has identifying information comprising a subject name that matches the subject name of the first version of the first certificate.

9. The method of claim 8, further comprising:
   accessing a plurality of security assets associated with the subject name;
   identifying at least one security asset of the plurality of security assets that is associated with the second version of the first certificate; and
   asynchronously introducing the at least one security asset associated with the second version of the first certificate to the second server.

10. The method of claim 1, wherein the application service provided to the client computing device while the at least one security asset is being introduced includes an information storage and retrieval service.

11. One or more non-transitory computer storage media storing computer-readable instructions that when executed by a processor, cause the processor to perform operations, the operations comprising:
    initiating, via a first server, a communication session with a second server;
    providing, via the first server, a first certificate to the second server, the first certificate having identifying information including a first public key and a first subject name that, in conjunction, uniquely identify the first certificate;
    receiving, from the second server and in response to providing the first certificate to the second server, a second certificate;
    determining, by the first server, that the second certificate is trusted by determining that the second certificate has identifying information matching the identifying information of the first certificate;
    in response to determining that the second certificate is trusted, encrypting, by the first server, data using the first public key;
    providing the encrypted data, that was encrypted using the first public key, to the second server;
    receiving, from the second server, a verification of decryption of the encrypted data; and
    based on receiving the verification, asynchronously introducing at least one security asset associated with the second certificate to the second server, such that an application service provided by the second server undergoes a temporary interruption during the asynchronous introduction of the at least one security asset into the second server, and such that the application service is provided to a client computing device via another server while the at least one security asset is being introduced to the second server.

12. The one or more non-transitory computer storage media of claim 11, further comprising:
    accessing a plurality of security assets associated with the first subject name of the first certificate; and
    accessing the at least one security asset from the plurality of security assets.

13. The one or more non-transitory computer storage media of claim 11, further comprising:
    identifying, by the first server, that the second server is transitioned from the first certificate to the second certificate; and causing, by the first server, the first certificate to be disabled in response to identifying that the second server is transitioned from the first certificate to the second certificate.

14. The one or more non-transitory computer storage media of claim 13, further comprising:
receiving a command to disable the first certificate from the client computing device; and
causing the first certificate to be disabled in response to receiving the command.

15. The one or more non-transitory computer storage media of claim 14, wherein the identifying information of the first certificate comprises an issuer name of the first certificate and a time period for which the first certificate is enabled.

16. The one or more non-transitory computer storage media of claim 15, further comprising:
receiving a second command to override the time period of the first certificate from the client computing device; and
causing the first certificate to be disabled in response to receiving the second command.

17. A system comprising:
at least one processor; and
one or more non-transitory computer storage media storing computer-readable instructions that when executed by the at least one processor, cause the at least one processor to perform operations comprising:
initiate, via a first server, a communication session with a second server;
provide, via the first server, a first certificate to the second server, the first certificate having identifying information including a first public key and a first subject name that, in conjunction, uniquely identify the first certificate;
receive, from the second server and in response to providing the first certificate to the second server, a second certificate;
determine, by the first server, that the second certificate is trusted by determining that the second certificate has identifying information matching the identifying information of the first certificate;
in response to determining that the second certificate is trusted, encrypt, by the first server, data;
provide the encrypted data to the second server;
receive, from the second server, a verification of decryption of the encrypted data; and
based on receiving the verification, asynchronously introducing at least one security asset associated with the second certificate to the second server, such that an application service undergoes a temporary interruption during the asynchronous introduction of the at least one security asset into the second server, and such that the application service is provided via another server while the at least one security asset is being introduced.

18. The system of claim 17, further comprising:
establish, by the first server, a secure communication with the second server based on providing the encrypted data to second server.

* * * * *